United States Patent [19]

Gutmann et al.

[11] Patent Number: 4,540,438

[45] Date of Patent: Sep. 10, 1985

[54] FERROSILICON AGGREGATE FOR CONCRETE AND RESINS

[76] Inventors: Paul F. Gutmann, 105 Farwood Dr., Moreland Hills, Ohio 44022; Donald R. Holm, 4724 Holm Rd., Oregon, Wis. 53575

[21] Appl. No.: 537,062

[22] Filed: Sep. 29, 1983

[51] Int. Cl.$^3$ .................................................. C04B 7/02
[52] U.S. Cl. ....................................... 106/97; 106/314; 106/36; 404/21
[58] Field of Search ............... 106/97, 314, 36, 14.05; 404/21

[56] References Cited

U.S. PATENT DOCUMENTS

| | | | |
|---|---|---|---|
| 1,802,667 | 4/1931 | Newhall | 106/97 |
| 3,668,150 | 6/1972 | Horvitz | 106/314 X |

*Primary Examiner*—William R. Dixon, Jr.
*Assistant Examiner*—Steven Capella
*Attorney, Agent, or Firm*—Woodling, Krost, Rust & Hochberg

[57] ABSTRACT

A floor topping, mortar and grout which include ferrosilicon in particle form. The ferrosilicon increases the wear resistance and impact strength of the topping, mortar or grout without the oxidation or discoloration normally attributable to materials which include iron borings. In addition, the ferrosilicon increases the light reflectivity of the topping material.

A method of hardening and rendering wear resistant a concrete structure such as a floor comprising the placement of a mixture of Portland cement and particles of ferrosilicon material at the surface of the structure and thereafter troweling the mixture to a smooth surface.

15 Claims, No Drawings

FERROSILICON AGGREGATE FOR CONCRETE AND RESINS

BACKGROUND OF THE INVENTION

The use of metallic iron floor toppings has been heretofore known. The benefits that have been derived from such toppings and the problems that have occured since the first floor toppings were put in place in the early 1900's are known. An early patent for a metallic shake is U.S. Pat. No. 1,113,112, of S. W. Flesheim. The patent describes the use of metallic iron borings which are combined with Portland cement in various percentages depending upon the type of metallic floor topping desired. Throughout the early history, this was believed to be the only metallic iron boring mix used in the application of increased wear resistance on industrial floors. It became known as time went on and more floors of this type were installed, that there were some inherent problems with the use of metallic iron borings. For example, the floor gave a very dark color and was extremely poor in light reflectivity. When the floor came in contact with water and/or calcium chloride ions, whether it had been incorporated into the concrete mix to accelerate setting times, or from being deposited on the surface from vehicles that had been out on the streets during the winter time when chloride had been put on the roads to assist in deicing, extreme oxidation of the metallic iron borings became evident. Disruption of the surface due to the expansion caused by the oxidation of metallic particles caused disintegration, staining, tracking of oxidized material and a generally unsightly floor.

Various coatings over the years have been applied over the freshly placed metallic iron boring shakes and toppings such as chlorinated rubber curing and sealing compound and other types of sealing materials. After traffic in heavy-duty areas ran over the floor for a given period of time, the thin coating wore off and the metallic iron particles were once again exposed to the atmosphere. It became apparent that there were limitations on where metallic iron toppings could be installed. They generally had to be installed in dry warehouses and dry factory areas. By placing a metallic iron topping outside, oxidation would occur almost immediately on the surface due to climatic conditions. In areas of freezers and food processing plants which have to maintain high cleanliness standards, large amounts of cleaning agents and water are always present. Extreme oxidation and unsightliness occured quickly after the installation of these floors.

Over the years, various chemicals have been incorporated with metallic iron toppings such as shown in U.S. Pat. No. 3,668,150. U.S. Pat. No. 3,668,150 shows the incorporation of sodium nitrite in the mix with metallic iron to help prevent the oxidation of the iron particles. Though it is true that it does help prevent initial oxidation, as soon as the particles are exposed to water, chlorides and air oxidation occurs as rapidly as in a mix without the sodium nitrite.

U.S. Pat. No. 1,348,099 discloses the use of copper plated iron borings or turnings as a surface finish in concrete floors. The plating of iron particles, however, for the purpose of retarding oxidation is not only expensive but is of limited effectiveness. In time, the plating erodes causing oxidation of the particles to commence.

In U.S. Pat. No. 1,056,069, silicon carbide material (i.e., Carborundum) is incorporated in concrete to produce a wear resistant floor surface.

U.S. Pat. No. 1,802,667 discloses a Portland cement composition which includes aluminum and ferrosilicon. The ferrosilicon is added for the purpose of allegedly reacting with calcium hydroxide. Presumably by setting up a reaction with the calcium hydroxide, there is created an insoluble compound which retards disintegration of the concrete in the presence of salt carrying percolating water.

Another aspect to improving floor compositions has come about due to the energy conservation that companies are trying to introduce. That is the ability to put in an abrasion resistant floor in factories and work areas and also maintain some light reflectivity values. The original metallic iron topping was extremely dark and various pigments have been added to lighten the floor surfaces. White Portland cement has been used for some years incorporating titanium dioxide and other lightening agents. The problem still exists that as soon as the dark metallic iron boring surface is exposed through wear, water or chlorides, oxidation occurs rapidly.

SUMMARY OF THE INVENTION

Briefly summarized, the invention is directed to a floor topping in which a "shake on" coating is applied having a ferro alloy constituent. In the preferred embodiment, the ferro alloy is ferrosilicon. The invention is also directed to a mortar topping which includes, as a constituent thereof, a ferro alloy. This invention is still further directed to a grout with special aggregates containing ferro alloys. The presence of a ferro alloy in the topping, mortar or grout provides for good light reflectivity, a lack of oxidation when exposed to water and superior abrasion and impact resistance in areas where the surface is exposed to both heavy wear, moisture and chlorides.

DETAILED DESCRIPTION OF THE INVENTION

This invention is directed to a floor topping in which a ferro alloy is provided as a constituent for the purpose of rendering the floor more resistant to abrasion as compared to floors without such a topping. In the preferred embodiment of the invention, ferrosilicon material is used. The invention also contemplates the use of constituent in a specialty grout for industrial and commercial uses in concrete construction.

It has been generally known for many years that metallic iron boring surfaces generally provide for improved abrasion resistance when compared to a plain concrete floor. When using a National Bureau of Standards testing machine covered by ASTM-C 779-76, it has been found that normal concrete floors generally wear at approximately 0.03–0.04 inches per hour of testing. Concrete floors which include a topping of metallic iron borings fall into the range of 0.007–0.009 inches of wear in the same amount of time using the same test method.

It has been found that the use of ferro alloys as a constituent in a topping renders a concrete surface more wear resistant than is the case where metallic iron borings are used. Where ferrosilicon is used as a constituent in a topping, it has been found that the concrete floor exhibits a wear resistance of from 0.004–0.005 inches utilizing the National Bureau of Standards testing machine as described above. A ferrosilicon topping, on an average, has shown 77% greater wear resistance than metallic iron borings.

The fact that ferrosilicon shows greater wear resistance than metallic iron borings is due to its hardness and toughness being a combination of iron and silicates. Ferrosilicon material is an alloy that may be produced in an electric arc furnace or in a blast furnace which results in an extremely hard, shiny, metallic aggregate. Ferrosilicon can also be obtained in an electric arc furnace from the manufacturing of alumina from bauxite. Under this method it is a byproduct of the dry process alumina. In the operation of this process a mixture of ferruginous and siliceous bauxites, containing the proper proportions of iron, silicon, and titanium, is first sintered to remove water. There must be enough iron and silicon present to dissolve all the titanium after reduction and permit it to be tapped out as a ferrosilicon aluminum-titanium alloy. The sinter is then smelted in an electric furnace with the proper amount of coke to reduce all of the impurities and a little of the alumina. The ferrosilicon aluminum-titanium alloy is later tapped out the other side of the furnace.

Chemical composition of the byproduct will vary depending upon the composition of the bauxite and the amount of titanium present.

Through various tests of ferrosilicons and chemicals that attack industrial floors, it was observed that the ferrosilicon held up and was more corrosive resistant than iron borings and natural aggregates under various acids and chemicals. Due to the nature of ferrosilicon material, the light reflectivity is greater than metallic iron borings. Quantitatively, the light reflectivity of ferrosilicon is approximately 25% greater than metallic iron borings. Metallic iron borings are extremely dark in color and, even though combined with white Portland cement and titanium dioxide, cut down on the light reflectivity. Ferrosilicon material, being silvery and shiny in nature, enhances the light reflectivity of floor toppings.

The ferrosilicon material contemplated by this invention may have varying proportions of silicon and other metals depending upon the intended application. Low silicon grades of ferrosilicon usually start at 10% silicon and ordinarily do not exceed 17–20% silicon. The lower grade ferrosilicon can contain low percentages of chromium, manganese, carbon, aluminum and titanium. Higher grade silicon products nominally contain, respectively, 25%, 50, 65%, 75%, 85% and 90–95% silicon. The higher grade ferrosilicon can contain low percentages of chromium, manganese, carbon, aluminum and titanium.

A ferrosilicon material containing 50% silicon is, by far, the most widely used in the industry and is employed both as a blocking agent in a steel blast furnace and as a ladle addition. The 10–15% and 25% silicon grades of ferrosilicon are sometimes used in an open-hearth furnace and foundries for blocking the heat, and may also be used as deoxidizers added prior to the addition of more expensive alloys.

Ferrosilicon alloys are available commercially in lumps of crushed form. This invention contemplates the use of ferrosilicon material having particles sizes ranging from 6 milimeters (¼ inch) to 200 mesh.

Several different aspects of the invention are contemplated and will now be described.

First, ferrosilicon material may be used as a constituent of a "shake on" coating for concrete floors. Examples follow:

EXAMPLE 1

A dry mix of approximately two parts of ferrosilicon aggregate to one part of grey Portland cement for a "shake on" application for industrial and commercial floor toppings.

EXAMPLE 2

A dry mix of approximately two parts of ferrosilicon material to one part of white Portland cement for a "shake on" application for industrial and commercial floor toppings.

When used as the constituent of a "shake on" coating, the silicon content of the ferrosilicon material may vary from a low proportion of 10% to a high proportion of 95%. Excellent results have been achieved with a silicon content in the ferrosilicon material of 10% to 20% silicon, 1% to 5% aluminum and 1% to 5% titanium additions and the balance in iron. Minor elements may be present in the form of carbon, chromium, manganese and phosphorous. Other proportions of silicon and other metals may be used, however, depending upon the application and desired result. Depending upon the level of corrosion resistance desired, various levels of additional elements may be added. The addition of chromium and manganese produce a mild corrosive resistant aggregate while the addition of aluminum and titanium produce high corrosive resistant aggregate.

The 2:1 ratio of Examples 1 and 2 above may be varied depending upon conditions. Ratios of 3:1 (ferrosilicon to Portland cement) or higher may be used, or ratios of 1:1 or lower may be used.

The particle size of ferrosilicon material used in a "shake on" application may, as noted above, vary from a large particles size of 6 millimeters (¼ inch) down to 200 mesh material.

In addition to the use of ferrosilicon material in combination with Portland cement (either grey or white cement), this invention also contemplates a shake of ferrosilicon material (without cement or other materials) on the surface of concrete pavements or asphalt pavement for light reflectivity, skid resistance and use as lane markings. In this application, ferrosilicon material having particles sizes as large as 6 millimeters (¼ inch) may be placed or broadcast over a freshly poured floor in a desired pattern or location. The resulting concrete structure is wear and impact resistant, skid resistant, oxidation resistant and light reflective. The ferrosilicon in this application needs high reflectivity and small percents of aluminum and titanium can help reflectivity.

The invention also contemplates the use of ferrosilicon material for mortar-type applications in industrial floors and in other concrete structures. Such mortar applications may include an overlay over an existing floor, bridge decks and other applications.

EXAMPLE 3

A dry mix of three parts of ferrosilicon material to one part grey Portland cement for mortar-type applications in industrial floors and other industrial structures.

The 3:1 ratio of ferrosilicon material to Portland cement described in Example 3 above is suitable for use in heavy-duty industrial applications. In more demanding applications, a 1:1 ratio of ferrosilicon material and Portland cement may be used or a 2:1 ratio ferrosilicon to Portland cement may be used. The aggregate may also include sand or stone.

Where greater light reflectivity is desired, white Portland cement may be used as follows.

EXAMPLE 4

A dry mix of three parts ferrosilicon material to one part white Portland cement for mortar-type applications in industrial floors and other industrial structures.

Still further, the invention contemplates the use of ferrosilicon material as an aggregate in Portland cement for use as a grout. Grouts are used in industry for such purposes as leveling machines. A high strength grout is used where impact resistance is desired.

This invention contemplates a proportion of 10–100% ferrosilicon material in the total grout mix. The following is an example:

EXAMPLE 5

A dry mix of 10–20% ferrosilicon, 25% sand, 50% Portland cement, with the remainder being plasticizers for use as a grout in industrial applications.

In all of the above examples, the content of silicon in the ferrosilicon material may vary from a low of 10% to a high of 95% silicon. Excellent results have been achieved with a silicon content of 10% to 20% silicon, 1% to 5% aluminum and 1% to 5% titanium addition and the balance in iron. Minor elements may be present in the form of carbon, chromium, manganese and phosphorous.

The advantages of ferrosilicon material insofar as increased light reflectivity have been discussed above. The invention also contemplates the addition of titanium dioxide to the mix to increase light reflectivity.

The invention still further contemplates the process of hardening and rendering more wear resistant, a concrete structure such as a floor and the like so as to prolong the life thereof. The method of this invention consists of applying to the surface of such concrete prior to its setting, a dry mixture of cement and particles of ferrosilicon material, thoroughly rubbing the same into contact with the surface of said structure so as to moisten the same and, finally, troweling the same to a smooth, burnished surface. The particle sizes of ferrosilicon material as contemplated by this method range from a large particle size of 6 milimeters (¼ inch) to a small size of 200 mesh. The silicon content of the ferrosilicon material may range from a low value of 10% to 20% silicon, 1% to 5% aluminum and 1% to 5% titanium addition and the balance in iron. Minor elements may be present in the form of carbon, chromium, manganese and phosphorous.

This invention contemplates still further the use of ferrosilicon material with a polymeric resin for a mortar or topping over industrial and commercial floors and the like. Such a topping affords wear resistance and chemical resistance and may be used in such environments as hospitals, food processing industries and the like.

EXAMPLE 6

A mixture of polymeric resins and ferrosilicon for use as a mortar or topping in structures such as a floor or the like. The mixture consists of three parts ferrosilicon particles and one part resin for acid resistance and impact resistance.

Where it is desired to use the invention of this application as a mortar in a high temperature environment such as the area adjacent an open-hearth furnace, a modified heat resistant cement may be used with ferrosilicon material. A mixture of heat resistant cements and ferrosilicon for use as a mortar, concrete or topping in structures such as a floor or the like, the mixture consists of 1 part heat resistant cement to 8 parts ferrosilicon to 1 part heat resistant cement to 1 part ferrosilicon.

What is claimed is:

1. In a particulate mixture for embedding into the unset upper surface of a concrete floor the improved mixture comprising
   Portland cement, and
   ferrosilicon particles having a silicon content of no more than 20%, and having a particle size range of 6 mm. to 200 mesh; whereby all ferrosilicon in said mixture is inert to chemical reaction with the other components of said mixture.

2. The improved composition of claim 1 and in which said ferrosilicon particles consist essentially of an alloy of 10–20% silicon, 1–5% aluminum, 1–5% titanium and the balance iron.

3. The improved composition of claim 1 and in which the said Portland cement is white.

4. In a dry mix for use in making concrete mortar, the improved composition consisting essentially of
   Portland cement, and
   ferrosilicon particles having a silicon content of no more than 20%;
   said ferrosilicon particles being of sufficiently coarse mesh that essentially no chemical reaction is caused between said ferrosilicon particles and the said Portland cement.

5. In a dry mix for use in making concrete mortar, the improved mixture comprising
   Portland cement, and
   ferrosilicon particles having a silicon content of no more than 20%, and having a particle size range of 6 mm. to 200 mesh;
   whereby all ferrosilicon in said mixture is inert to chemical reaction with the other components of said mixture.

6. The improved composition of claim 4 and in which the ratio of said Portland cement to said ferrosilicon particles is 1:2 by weight.

7. The improved composition of claim 4 and in which the ratio of said Portland cement to said ferrosilicon particles is 1:1 by weight.

8. The improved composition of claim 4 and in which said ferrosilicon particles consist essentially of an alloy of 10–20% silicon, 1–5% aluminum, 1–5% titanium and the balance iron.

9. In a dry mix for use as a cement grout, the improved composition comprising
   Portland cement, and
   ferrosilicon particles having a silicon content of no more than 20%;
   said ferrosilicon particles being of sufficiently coarse mesh that essentially no chemical reaction is caused between said ferrosilicon particles and the said Portland cement.

10. In a dry mix for use as a cement grout, the improved mixture comprising
    Portland cement, and
    ferrosilicon particles having a silicon content of no more than 20%, and a particle size range of 6 mm. to 200 mesh;
    whereby all ferrosilicon in said mixture is inert to chemical reaction with the other components of said mixture.

11. The improved composition of claim 10 and further comprising plasticizers, the said Portland cement, ferrosilicon particles, and plasticizers being present in the ratios of 50% Portland cement, and 40–50% ferrosilicon, and balance plasticizers.

12. In a wear resistant topping for industrial floors and the like, the improved composition consisting essentially of heat resistant cement, and ferrosilicon particles having a silicon content of no more than 20%;

said ferrosilicon particles being of sufficiently coarse mesh that essentially no chemical reaction is caused between said ferosilicon particles and the said heat resistant cement.

13. In a wear resistant topping for industrial floors and the like, the improved mixture comprising heat resistant cement, and ferrosilicon particles having a silicon content of no more than 20%, and a particle size range of 6 mm. to 200 mesh;

whereby all ferrosilicon in said mixture is inert to chemical reaction with the other components of said mixture.

14. In a topping for floors and the like, the improved composition consisting essentially of acid resistant cement, and ferrosilicon particles having a silicon content of no more than 20%;

said ferrosilicon particles being of sufficiently coarse mesh that essentially no chemical reaction is caused between said ferrosilicon particles and said acid resistant cement.

15. In a topping for floors and the like, the improved mixture comprising acid resistant cement, and ferrosilicon particles having a silicon content of no more than 20%, and a particle size range of 6 mm. to 200 mesh;

whereby all ferrosilicon in said mixture is inert to chemical reaction with the other components of said mixture.

* * * * *